US012049003B2

(12) United States Patent
Xie et al.

(10) Patent No.: US 12,049,003 B2
(45) Date of Patent: Jul. 30, 2024

(54) MOVABLE HYBRID MACHINING ROBOT BASED ON THREE-DEGREE-OF-FREEDOM FORCE-CONTROLLED PARALLEL MODULE

(71) Applicant: TSINGHUA UNIVERSITY, Beijing (CN)

(72) Inventors: Fugui Xie, Beijing (CN); Xinjun Liu, Beijing (CN); Zenghui Chong, Beijing (CN); Jinsong Wang, Beijing (CN)

(73) Assignee: TSINGHUA UNIVERSITY (CN)

( * ) Notice: Subject to any disclaimer, the term of this patent is extended or adjusted under 35 U.S.C. 154(b) by 716 days.

(21) Appl. No.: 17/059,755

(22) PCT Filed: Nov. 19, 2018

(86) PCT No.: PCT/CN2018/116130
§ 371 (c)(1),
(2) Date: Nov. 30, 2020

(87) PCT Pub. No.: WO2019/233038
PCT Pub. Date: Dec. 12, 2019

(65) Prior Publication Data
US 2021/0229265 A1    Jul. 29, 2021

(30) Foreign Application Priority Data
Jun. 5, 2018  (CN) .......................... 201810581018.3

(51) Int. Cl.
*B25J 5/00* (2006.01)
*B25J 5/02* (2006.01)
(Continued)

(52) U.S. Cl.
CPC ................. *B25J 5/007* (2013.01); *B25J 5/02* (2013.01); *B25J 9/0045* (2013.01); *B25J 9/0072* (2013.01);
(Continued)

(58) Field of Classification Search
CPC ....... B25J 5/007; B25J 5/02; B25J 5/04; B25J 9/0069; B25J 9/0072; B25J 9/009;
(Continued)

(56) References Cited

U.S. PATENT DOCUMENTS

| 5,796,229 A | * | 8/1998 | Akeel ..................... B24B 55/00 318/434 |
| 6,540,458 B1 | * | 4/2003 | Ponisch ................. B25J 9/0069 414/733 |

(Continued)

FOREIGN PATENT DOCUMENTS

| CN | 108000483 A | * | 5/2018 | .............. B25J 5/007 |
| CN | 108032277 A | * | 5/2018 | |

(Continued)

OTHER PUBLICATIONS

CN 108032278 A (Gang Su) May 15, 2018 (full text). [online] [retrieved on Dec. 6, 2023]. Retrieved from: Clarivate Analytics. (Year: 2018).*

(Continued)

*Primary Examiner* — Joseph Brown
(74) *Attorney, Agent, or Firm* — Jaffery Watson Mendonsa & Hamilton LLP

(57) ABSTRACT

A movable hybrid machining robot is provided based on a three-degree-of-freedom force-controlled parallel module. In one example, the robot comprises: an automated guided vehicle (III-11) configured to ensure a large moving stroke of the robot; a linear guide rail (III-12) configured to control movement of the hybrid robot when the automated guided vehicle (III-11) is parked; a planar two-degree-of-freedom hybrid robotic arm configured to control in-plane two-degree-of-freedom motion, wherein the in-plane two-degree-of-freedom motion is driven by a motor on a base (21); and a three-degree-of-freedom, force-controlled parallel machining module (I) configured to control one translational
(Continued)

degree of freedom and two rotational degrees of freedom and to control positive pressure on an end effector (564).

7 Claims, 4 Drawing Sheets

(51) Int. Cl.
| | | |
|---|---|---|
| *B25J 9/00* | (2006.01) | |
| *B25J 9/10* | (2006.01) | |
| *B25J 9/16* | (2006.01) | |
| *B25J 11/00* | (2006.01) | |

(52) U.S. Cl.
CPC ........... *B25J 9/1065* (2013.01); *B25J 9/1694* (2013.01); *B25J 11/0065* (2013.01)

(58) Field of Classification Search
CPC .... B25J 9/1065; B25J 9/1694; B25J 11/0065; B25J 17/0216; B25J 9/0045
See application file for complete search history.

(56) References Cited

U.S. PATENT DOCUMENTS

| | | | |
|---|---|---|---|
| 2013/0226340 A1* | 8/2013 | Buchstab | ................... B25J 5/04 |
| | | | 700/245 |
| 2019/0262966 A1* | 8/2019 | Scafutto Scotton | ........................ |
| | | | B25J 11/0065 |

FOREIGN PATENT DOCUMENTS

| | | | | |
|---|---|---|---|---|
| CN | 108032278 A | * | 5/2018 | ............. B25J 19/04 |
| GB | 2083795 A | * | 3/1982 | ............. B23P 19/10 |

OTHER PUBLICATIONS

GB 2083795 A (John Streeter) Mar. 31, 1982 (full text). [online] [retrieved on Dec. 6, 2023]. Retrieved from: Clarivate Analytics. (Year: 1982).*

* cited by examiner ic # MOVABLE HYBRID MACHINING ROBOT BASED ON THREE-DEGREE-OF-FREEDOM FORCE-CONTROLLED PARALLEL MODULE

CROSS-REFERENCE TO RELATED APPLICATION

The present application claims priority to PCT/CN2018/116130 filed Nov. 19, 2018 and entitled "Movable Hybrid Machining Robot Based On Three-Degree-of-Freedom Force-Controlled Parallel Module", which in turn claims priority to Chinese Application No. 2018105810183 filed on Jun. 5, 2018 and entitled "Movable Hybrid Machining Robot Based On Three-Degree-of-Freedom Force-Controlled Parallel Module". Both of the aforementioned applications are incorporated herein in their entirety for all purposes.

TECHNICAL FIELD

The present application relates to the technical field of numerical control equipment manufacturing, and more particularly to movable hybrid machining robots.

BACKGROUND

In a number of fields including, but not limited to, aerospace, energy and power, and heavy equipment, integral large structural parts accounts for an increasing proportion in the overall structure to give full play to the mechanical properties of the materials. However, a great number of problems will arise when the traditional machining technologies are applied to the processing of large and complex structural parts. As one of the important sources of renewable and clean energy, wind energy is being paid more and more attention to by the reasonable development and utilization thereof. Wind turbine blades, as an important component of wind turbines, work in harsh environments, their surface quality is therefore susceptible to damage, which greatly affects the normal operation of the turbines. Secondary grinding of the blade for restoring the surface quality is a conventional method to ensure the long-term and effective operation of wind turbines. Because large wind turbine blades are large in size and prone to produce dust and other pollutants during the grinding process, the use of robots for the processing of large and complex components as well as large wind turbine blades is essential to not only ensure quality, but also enhance efficiency. In addition, the machined surfaces of complex structural parts and wind turbine blade profiles are mostly free-form surfaces, so it is necessary to provide five-axis computer numerical control ("CNC") processing capability for the processing of these surfaces.

Due to the huge size of large structural parts and large wind turbine blades, when a traditional machine tool is employed for processing, it will inevitably lead to a further increase in the size of the machine tool, resulting in a large amount of subsequent maintenance of the equipment. Therefore, it is of great significance to develop suitable large-stroke mobile robots. The hybrid machining robots organically combine the advantages of serial robots and parallel robots, thereby ensuring good stiffness and dynamic response while maintaining the working space, improving the overall performance and adapting to the complex requirements of the processing industry.

SUMMARY

The present application is intended to address at least one of the technical problems in the prior art.

Some embodiments provide movable hybrid machining robots based on three-degree-of-freedom force-controlled parallel module which in some cases have the advantages of enlarging high-quality workspace range of the robot and ensuring processing quality.

In various embodiments, a movable hybrid machining robot based on three-degree-of-freedom force-controlled parallel module is disclosed, including: an automated guided vehicle configured to ensure a large moving stroke of the robot; a linear guide rail configured to control movement of the robot when the automated guided vehicle is parked; a planar two-degree-of-freedom hybrid robotic arm configured to control in-plane two-degree-of-freedom motion, where the in-plane two-degree-of-freedom motion is driven by a base motor; and a three-degree-of-freedom, force-controlled parallel machining module configured to control one translational degree of freedom and two rotational degrees of freedom and to control positive pressure on an end effector.

In some instances of the aforementioned embodiments, in the movable hybrid machining robots based on three-degree-of-freedom force-controlled parallel module, the three-degree-of-freedom, force-controlled parallel machining module is mounted at the end of the planar two-degree-of-freedom hybrid robotic arm to cooperate with the linear guide rail and the automated guided vehicle, so as to enlarge a high-quality workspace range of the robot, such that processing work of all curved surfaces of a large structural part is achieved in a single clamping process, and the processing quality is ensured by controlling the force on the end effector.

In various instances of the aforementioned embodiments, the planar two-degree-of-freedom hybrid robotic arm includes: a lower arm, which forms a parallelogram mechanism with a first linkage group to achieve a rotational motion around a center of rotation of a bottom revolute pair driven by the base motor; and a forearm, which forms a parallelogram mechanism with a second linkage group to achieve a rotational motion around a center of rotation driven by the base motor by means of applying a third linkage.

In one or more instances of the aforementioned embodiments, the three-degree-of-freedom, force-controlled parallel machining module includes: a base of parallel module; a movable platform of parallel module; an end effector; a force controller; a first limb, connected to the base of parallel module by means of one revolute pair, and connected to the movable platform of parallel module by means of two revolute pairs whose axes are perpendicular to each other; where the first limb includes a screw nut kinematic pair driven by an input to achieve the rotational degree of freedom between the screw and nut axis and the translational degree of freedom of the screw along the limb; and a second limb and a third limb, being of the same structure as the first limb; the first limb, the second limb and the third limb are respectively connected between the base of parallel module and the movable platform of parallel module to form a closed-loop parallel structure to ensure one translational degree of freedom and two rotational degrees of freedom when the movable platform is fixedly connected to the end effector.

In some instances of the aforementioned embodiments, the three-degree-of-freedom, force-controlled parallel machining module is mounted at an end of the planar two-degree-of-freedom hybrid robotic arm, carried by the automated guided vehicle by cooperating with the linear guide rail to enlarge a high-quality workspace range of the robot; or the three-degree-of-freedom, force-controlled parallel machining module is mounted at an end of the planar two-degree-of-freedom hybrid robotic arm, directly matched with the automated guided vehicle or full-stroke linear guide rails to increase a machining stroke of the robot.

In various instances of the aforementioned embodiments, the first limb includes: a first motor, one end of which is connected to the base of parallel module by means of a revolute pair; and a first screw nut pair, which is fixedly connected with the first motor to form a cylindrical kinematic pair to achieve a linear feeding degree of freedom and a rotational degree of freedom of the screw relative to the nut; where a screw in the first screw nut pair is connected to the movable platform of parallel module by means of one Hooke joint or two revolute pairs whose axes are perpendicular to each other.

In one or more instances of the aforementioned embodiments, the force controller includes: a force control spring, which controls the positive end pressure by controlling the position during operation; a damping shock absorber, which achieves vibration suppression under force control conditions through coordinating with the force control spring; and a controller housing, combined with the body structure of the parallel machining module to solve the problem that the force controller is not capable of bearing torque.

In some instances of the aforementioned embodiments, the force controller is disposed at a position in which the screw and the Hooke joint are connected in each of the first limb, the second limb and the third limb to achieve force control on the first limb, the second limb and the third limb; and the force controller is disposed at a position in which the movable platform of the three-degree-of-freedom, force-controlled parallel machining module is connected to the end effector, so as to control the force on the end effector.

In various instances of the aforementioned embodiments, the force controller further includes: a force sensor, which provides feedback on the positive pressure applied during operation; and a force/position hybrid control algorithm, through which force/position hybrid control of the end effector of the three-degree-of-freedom force-controlled parallel module is performed based on data fed back by the force sensor.

In one or more instances of the aforementioned embodiments, the force controller adopts a structure without force control module based on actual processing requirements.

BRIEF DESCRIPTION OF DRAWINGS

The foregoing and/or additional aspects of the present application will be obvious and readily understandable from the following description of the embodiments in conjunction with the drawings, where.

REFERENCE NUMERALS

Figure 1:
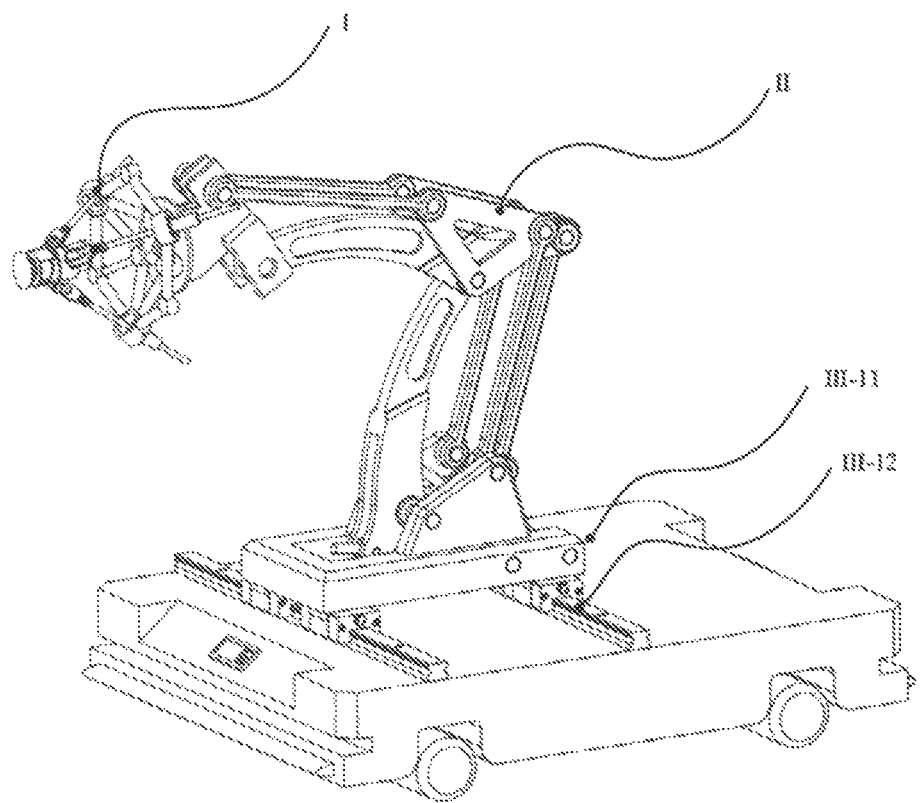
FIG. 1 is a schematic structural diagram of a movable hybrid machining robot based on three-degree-of-freedom force-controlled parallel module according to an embodiment of the present application.

I three-degree-of-freedom force-controlled parallel machining module
II linear feeding drive hybrid robotic arm
III-II/III-2 automated guided vehicle
III-I2/III-3 linear guide rail
21 robotic arm base
22 lower arm of robotic arm
24 first linkage group
25 attitude adjusting member
26 forearm of robotic arm
27 second linkage group
28 end effector
31/41 first limb
32/42 second limb
33/43 third limb
34/44/54 base of parallel machining module
35/45/55 movable platform of parallel module
36/46 electric grinding head
411/511 first motor
412/512 first screw
413 first force controller
414/513 first U-rotating member
4131 force control spring
4132 damping shock absorber
4133 controller housing
415/514 first spherical rotating member
561 grinding motor
562 movable platform force controller
563 end effector mounting flange
564 end effector

DETAILED DESCRIPTION

Embodiments of the present application are described in detail below, the examples of which are shown in the drawings, where the same or similar reference numerals throughout indicate the same or similar components or components having the same or similar functions. The embodiments described below in conjunction with the drawings are examples and are intended to explain the present application, but should not be construed as a limitation to the present application.

A movable hybrid machining robot based on three-degree-of-freedom force-controlled parallel module, according to embodiments of the present application, is described below with reference to the drawings.

Taking the electric grinding head as the end effector as an example to introduce the movable hybrid machining robot based on three-degree-of-freedom force-controlled parallel module according to an embodiment of the present application as follows, but it should be noted that electric spindle clamping tools or welding end effector can also be employed to meet the corresponding processing needs in the specific implementation.

It is provided by Embodiment 1 of the present application, as shown in FIG. 1, a movable hybrid machining robot based on three-degree-of-freedom force-controlled parallel module, including a three-degree-of-freedom, force-controlled parallel machining module I, a linear feeding drive hybrid robotic arm II, an automated guided vehicle III-11, and a linear guide rail III-12.

Figure 2:
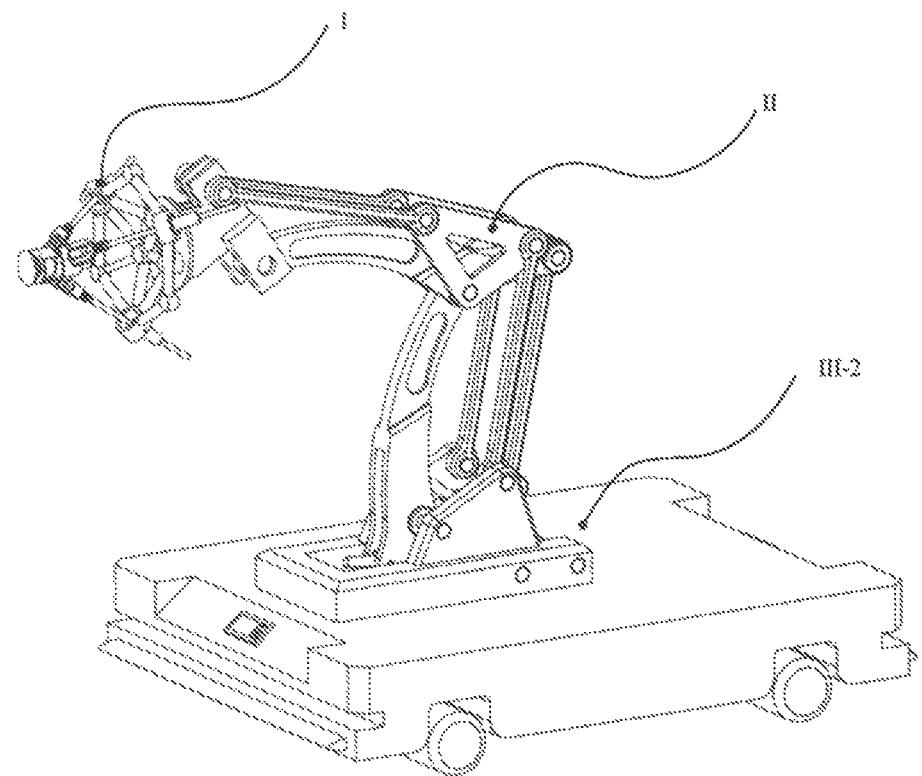
FIG. 2 is a schematic structural diagram of a movable hybrid machining robot based on three-degree-of-freedom force-controlled parallel module according to another embodiment of the present application.

It is provided by Embodiment 2 of the present application, as shown in FIG. 2, a movable hybrid machining robot based on three-degree-of-freedom force-controlled parallel module, further including: a three-degree-of-freedom, force-controlled parallel machining module I, a linear feeding drive hybrid robotic arm II, and an automated guided vehicle III-2.

Figure 3:
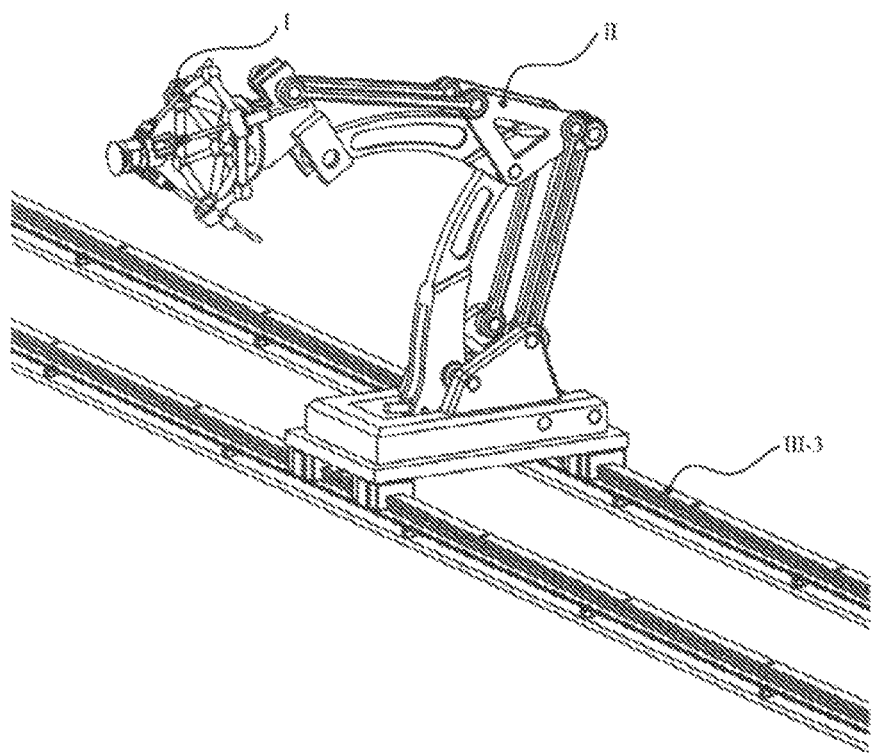
FIG. 3 is a schematic structural diagram of a movable hybrid machining robot based on three-degree-of-freedom force-controlled parallel module according to yet another embodiment of the present application.
Figure 4:
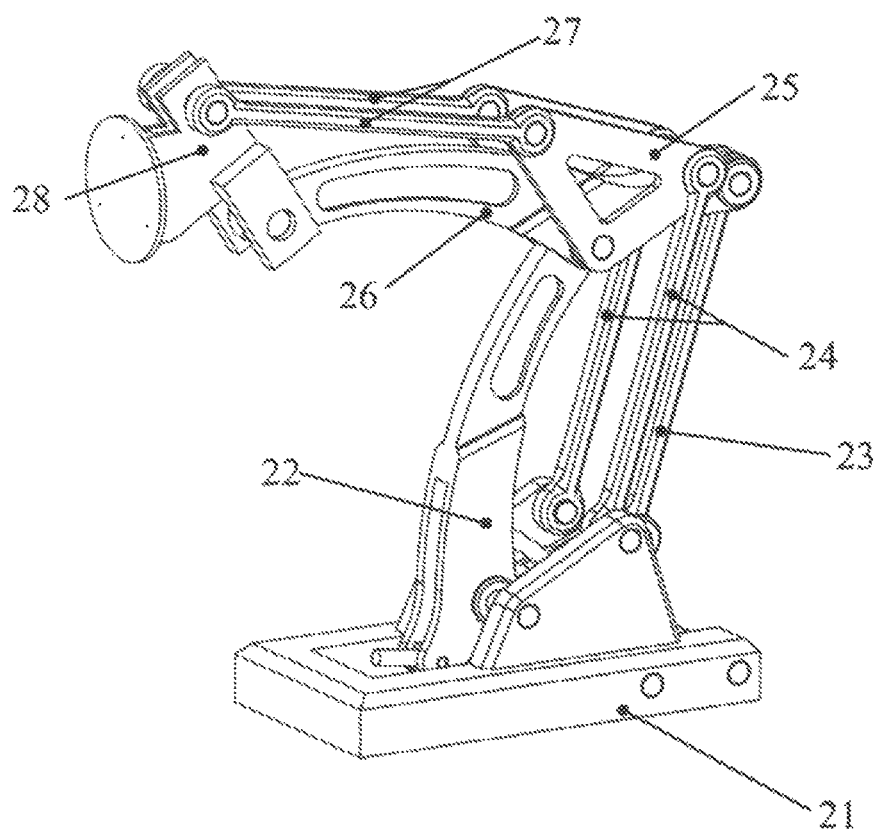
FIG. 4 is a schematic structural diagram of a planar two-degree-of-freedom hybrid robotic arm according to an embodiment of the present application.

It is provided by Embodiment 3 of the present application, as shown in FIG. 3, a movable hybrid machining robot based on three-degree-of-freedom force-controlled parallel module, also including: a three-degree-of-freedom, force-controlled parallel machining module I, a linear feeding drive hybrid robotic arm II, and a linear guide rail III-3.

Both the automated guided vehicle and the corresponding linear guide rail are mature commercial products, which can be purchased or customized according to the actual use, and thus will not be repeated here.

Further, as shown in FIG. 34, the planar two-degree-of-freedom hybrid robotic arm includes: a robotic arm base 21, a lower arm of the robotic arm 22, a driving arm of the forearm 23, a linkage group 24, an attitude adjusting member 25, a forearm of the robotic arm 26, a linkage group 27 and an end effector 28. The three-degree-of-freedom, force-controlled parallel machining module is fixedly connected to the end effector 28 of the two-degree-of-freedom plane parallel robotic arm. The linkage group 23 and the lower arm of the robotic arm 22 form a parallelogram mechanism, and the linkage group 27 and the forearm of the robotic arm 26 form a parallelogram mechanism. The revolute pair at the bottom end of the linkage group 23 is connected to a motor, and the upper end thereof is connected to the forearm of the robotic arm 26, so that the motor disposed on the base 21 of the robotic arm can drive the forearm of the robotic arm 26.

Figure 5:
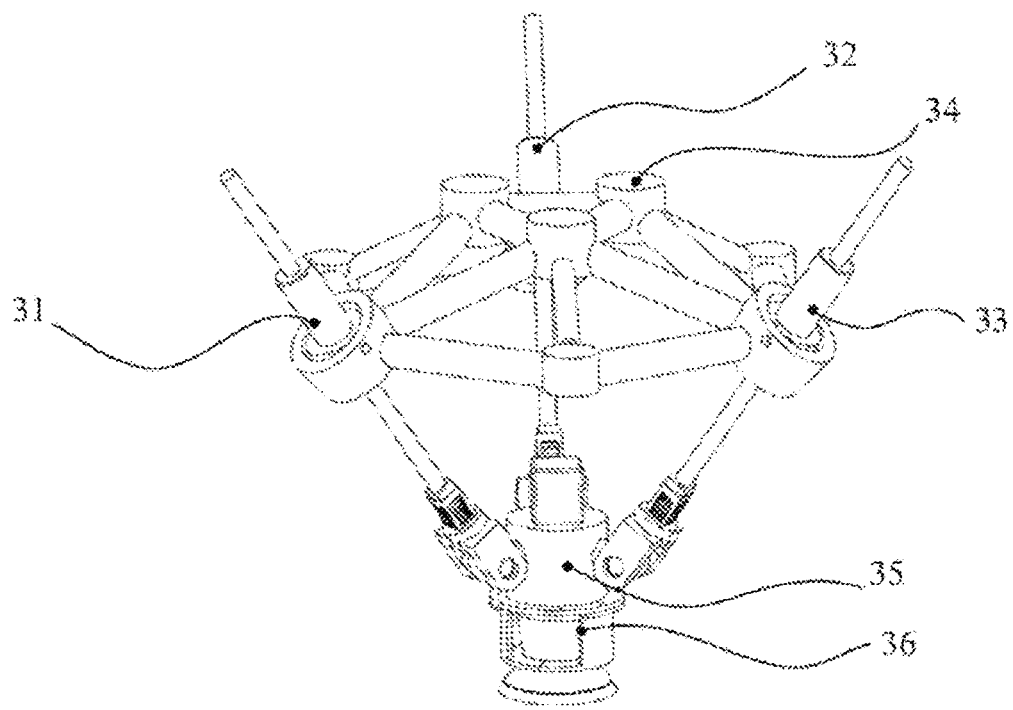
FIG. 5 is a schematic structural diagram of a three-degree-of-freedom, force-controlled parallel machining module according to an embodiment of the present application.

As shown in FIG. 5, the three-degree-of-freedom, force-controlled parallel machining module III includes a first limb 31, a second limb 32, a third limb 33, a base of parallel machining module 34, a movable platform of parallel machining module 35 and an electric grinding head 36.

The first limb 31 is connected to the base of parallel machining module 34 by means of a revolute pair, and is connected to the movable platform of parallel machining module 35 by means of two revolute pairs with mutually perpendicular axes or one Hooke joint, and the movable platform of parallel machining module 35 and the electric grinding head 36 are fixedly connected. The second limb and the third limb are of the same structure as the first limb, and these three limbs are connected between the base and the movable platform to form a closed-loop structure, such that one translational degree of freedom and two rotational degrees of freedom are achieved between the movable platform and the electric grinding head.

Figure 6:
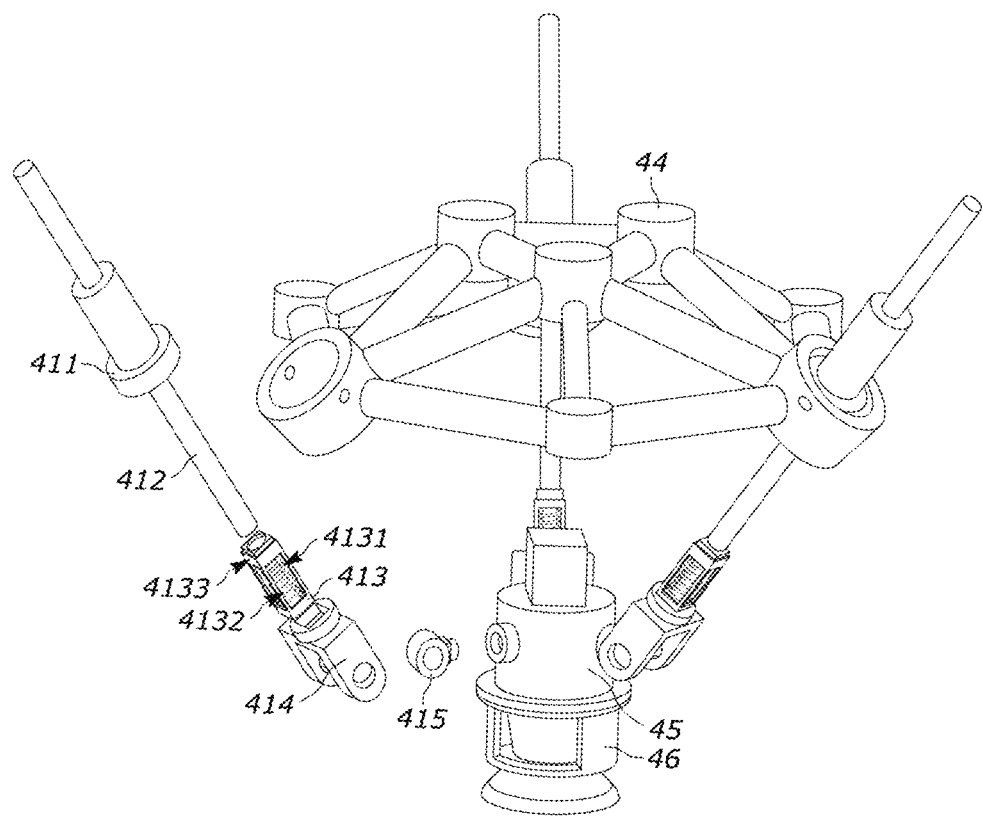
FIG. 6 is an exploded schematic diagram of a first limb, a base and a movable platform of a three-degree-of-freedom, force-controlled parallel machining module according to an embodiment of the present application.

Specifically, as shown in FIG. 6, the first limb includes a first motor 411, a first screw 412, a first force controller 413, a first U-rotating member 414 and a first spherical rotating member 415. The first motor 411 is mounted on the base of parallel machining module 44 to form a revolute pair, the rotor of the first motor is fixedly connected with the nut in the first ball screw pair, so that the first screw 412 has a rotational degree of freedom about the axis of the nut and a translational degree of freedom along the axis direction to form a cylindrical pair. An end of the first screw 412 is fixedly connected to the first force controller 413 (shown including a controller housing 4133, a force control spring 4131, and a damping shock absorber 4132), which is embedded in and fixedly connected to the first U-rotating member 414, so as to control the internal force of the first limb. The first U-rotating member 414 is connected with the first spherical rotating member 415 to form a revolute pair, and the first spherical rotating member 415 is connected with the movable platform to form a revolute pair, the axes of the two revolute pairs being perpendicular to each other to form a Hooke joint. The second limb and the third limb have the same structure as the first limb, and both enable the control of the internal force of the respective limbs and form a closed-loop parallel structure. The movable platform is fixedly connected with the electric grinding head 46 at the end.

Figure 7:
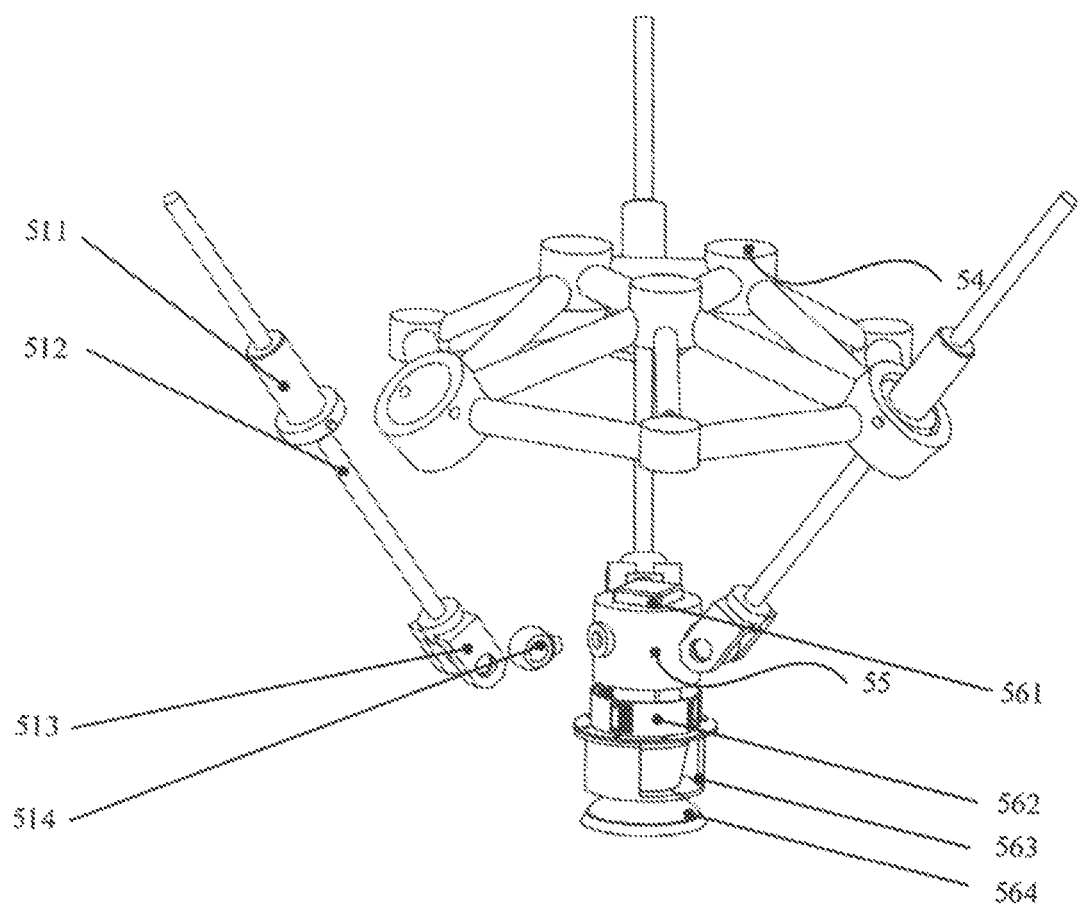
FIG. 7 is an exploded schematic diagram of a first limb, a base and a movable platform of a three-degree-of-freedom, force-controlled parallel machining module according to another embodiment of the present application.

In an embodiment of the present application, as shown in FIG. 7, the first limb may further include a first motor 511, a first screw 512, a first U-rotating member 513 and a first spherical rotating member 514; the end electric grinding head includes a grinding motor 561, a movable platform force controller 562, an end effector mounting flange 563 and an end effector 564. The first motor 511 is mounted on the base of parallel machining module 54 to form a revolute pair, and the rotor of the first motor is fixedly connected with the nut in the first ball screw pair, so that the first screw 512 has a rotational degree of freedom about the axis of the nut and a translational degree of freedom along the axis direction to form a cylindrical pair. An end of the first screw 512 is fixedly connected to the first U-rotating member 513, the first U-rotating member 513 is connected with the first spherical rotating member 514 to form a revolute pair, and the first spherical rotating member 514 is connected with the movable platform to form a revolute pair, the axes of the two revolute pairs being perpendicular to each other to form a Hooke joint. The second limb and the third limb have the same structure as the first limb, which enables the connection between the base of parallel machining module 54 and the movable platform of parallel machining module 55 and forms a closed-loop parallel structure. The grinding motor 561 is mounted on the movable platform of parallel machining module 55, and the movable platform of parallel machining module 55 is fixedly connected with the movable platform force controller 562 to achieve the control of the external force applied to the end electric grinding head. The mounting connection between the end effector 564 and the grinding motor 561 is achieved by means of the end effector mounting flange 563.

In an embodiment of the present application, the three-degree-of-freedom, force-controlled parallel machining module has a wide range of corners and is capable of processing complex profiles.

In an embodiment of the present application, the three-degree-of-freedom, force-controlled parallel machining module is equipped with various types of end effectors to perform a plurality of types of processing operations such as grinding, welding, and milling and drilling operations.

In an embodiment of the present application, the three-degree-of-freedom, force-controlled parallel machining module and the planar two-degree-of-freedom hybrid robotic arm can also be mounted directly onto the automated guided vehicle or full-stroke linear guide rails to enable processing of all profiles of large structural parts in a single clamping process.

In an embodiment of the present application, the three-degree-of-freedom, force-controlled parallel machining module enables force/position hybrid control of the end effector during the processing process by the force controller, which effectively improves processing quality.

In an embodiment of the present application, the force controller of the three-degree-of-freedom, force-controlled parallel machining module adopts a structure without force control module based on actual processing requirements.

The movable hybrid machining robot based on three-degree-of-freedom force-controlled parallel module according to the embodiments of the application has a large working stroke and a five-axis linkage processing capability, thereby being able to complete the processing of all the profiles of large wind turbine blades and large structural parts in a single clamping process.

In the movable hybrid machining robot based on three-degree-of-freedom force-controlled parallel module provided by the embodiments of the present application, the three-degree-of-freedom, force-controlled parallel machining module is mounted at the end of the planar two-degree-of-freedom hybrid robotic arm to cooperate with the linear guide rail, so as to enlarge a high-quality workspace range of the robot, such that processing work of all curved surfaces of a large structural part is achieved in a single clamping process, and the processing quality is ensured by controlling the force on the end effector.

With respect to the description of the present application, it should be noted that the orientation or positional relationship indicated by the terms such as "center," "longitudinal," "lateral," "length," "width," "thickness," "upper," "lower," "front," "back," "left," "right," "vertical," "horizontal," "top," "bottom," "inner," "outer," "clockwise," "counterclockwise," "axial," "radial," and "circumferential" is based on the orientation or positional relationship shown in the drawings, the purpose of which is only to facilitate describing the present application and simplify the description, rather than to indicate or imply that the device or element referred to must have a specific orientation, be constructed and operated in a specific orientation, and therefore cannot be construed as a limitation of the present application.

In addition, the terms "first" and "second" are for descriptive purpose only, and cannot be understood as indicating or implying the relative importance or the number of technical features implicitly indicated. Thus, the features defined with "first" and "second" may explicitly or implicitly include at least one of the features. In the description of the present application, "a plurality of" means at least two, such as two, three, unless otherwise specifically defined.

In the present application, unless otherwise clearly specified or defined, it should be noted that the terms "install," "connect with," "connect to," and "fix" should be understood in a broad sense, for example, it can be a fixed connection or a detachable connection, or an integral connection; it can be mechanically or electrically connected, directly connected or indirectly connected through an intermediary, or can be a connection within two components or an interaction therebetween. Unless otherwise clearly defined, for those of ordinary skill in the art, the specific meaning of the above terms in the present application can be understood according to the specific situations.

In the present application, unless otherwise clearly specified or defined, the first feature being "above" or "below" the second feature may be the direct contact of the first and second features, or the indirect contact of the first and second features through an intermediate medium. Moreover, the first feature being "above" the second feature may be the first feature being directly above or diagonally above the second feature, or may indicate only that the level of the first feature is higher than the second feature. The first feature being "below" the second feature may be the first feature being directly below or diagonally below the second feature, or may indicate only that the level of the first feature is lower than the second feature.

In the description of the present application, the reference terms "one embodiment," "some embodiments," "various embodiments", "instances", "examples," "specific examples," "some examples" or the like mean that the specific feature, structure, material or characteristic described in conjunction with the embodiment or example is included in at least one embodiment or example of the present application. In the description, the schematic representations of the above-mentioned terms do not necessarily refer to the same embodiment or example. Moreover, the described specific features, structures, materials or characteristics can be combined in any one or more embodiments or examples in a suitable manner. In addition, those skilled in the art can combine the different embodiments or examples and the features of the different embodiments or examples described in this specification without mutual contradiction.

Although the embodiments of the present application have been illustrated and described above, it can be understood that the embodiments are examples and should not be construed as limiting the present application. A person of ordinary skill in the art can make alterations, modifications, substitutions and transformations to the foregoing embodiments within the scope of the present application.

The invention claimed is:

1. A movable hybrid machining robot comprising:
   an automated, guided vehicle configured to ensure a predetermined moving stroke of the robot;
   a linear guide rail configured to control movement of the robot when the automated, guided vehicle is parked;
   a planar two-degree-of-freedom, hybrid robotic arm configured to control an in-plane two-degree-of-freedom motion, wherein the in-plane two-degree-of-freedom motion is driven by a base motor; and
   a three-degree-of-freedom, force-controlled parallel machining module configured to control one translational degree of freedom and two rotational degrees of freedom and to control positive pressure on an end effector, wherein the three-degree-of-freedom, force-controlled parallel machining module comprises:
   a base;
   a movable platform;
   the end effector;
   a force controller;
   a first limb connected to the base of the parallel machining module by one revolute pair, and connected to the movable platform of the parallel machining module by one Hooke joint or two revolute pairs whose axes are perpendicular to each other, wherein the first limb comprises (i) a first motor, one end of which is connected to the base by the one revolute pair; and (ii) a first screw nut pair fixedly connected with the first motor to form a cylindrical kinematic pair to achieve a linear feeding degree of freedom and a rotational degree of freedom of a screw in the screw nut pair relative to a nut in the screw nut pair, wherein the screw in the first screw nut pair is connected to the movable platform by the one Hooke joint or the two revolute pairs whose axes are perpendicular to each other; and a second limb and a third limb both of which have structure corresponding to that of the first limb, wherein the first limb, the second limb and the third limb are respectively connected between the base and the movable platform to form a closed loop parallel structure to ensure one translational degree of freedom and two rotational degrees of freedom when the movable platform is fixedly connected to the end effector.

2. The movable hybrid machining robot of claim 1, wherein the planar two-degree-of-freedom hybrid robotic arm comprises:

a lower arm forming a parallelogram mechanism with a first linkage group to achieve a rotational motion around a center of rotation of a bottom revolute pair driven by the base motor; and a forearm forming a parallelogram mechanism with a second linkage group to achieve a rotational motion around a center of rotation driven by the base motor using application of a third linkage.

3. The movable hybrid machining robot of claim 1, wherein the three-degree of-freedom, force-controlled parallel machining module is mounted:

at an end of the planar two-degree-of-freedom hybrid robotic arm, carried by the automated, guided vehicle by cooperating with the linear guide rail to enlarge a workspace range of the robot;

at an end of the planar two-degree-of-freedom hybrid robotic arm, carried by the automated, guided vehicle; or on the linear guide rail to increase a machining stroke of the robot.

4. The movable hybrid machining robot of claim 1, wherein the force controller comprises:

a force control spring controlling a positive end pressure by controlling a position during operation;

a damping shock absorber achieving a vibration suppression under force control conditions through coordinating with the force control spring; and a controller housing combined with the body structure of the parallel machining module to enhance the torque-bearing capacity of the force controller.

5. The movable hybrid machining robot of claim 1, wherein:

the force controller is disposed at a position in which the screw and the one Hooke joint or the two revolute pairs are connected in each of the first limb, the second limb and the third limb to achieve force control on the first limb, the second limb and the third limb; and the force controller is disposed at a position in which the movable platform of the three-degree of-freedom, force-controlled parallel machining module is connected to the end effector, so as to control the force on the end effector.

6. The movable hybrid machining robot of claim 5, wherein the end effector facilitates performance of one or more types of processing operations including: grinding, welding, milling and drilling operations.

7. The movable hybrid machining robot of claim 1, wherein the force controller further comprises a force sensor providing a feedback on a positive pressure applied during operation, wherein through the force controller, a force/position hybrid control of the end effector of the three-degree-of-freedom force-controlled parallel machining module is performed based on data fed back by the force sensor.

* * * * *